Dec. 4, 1962

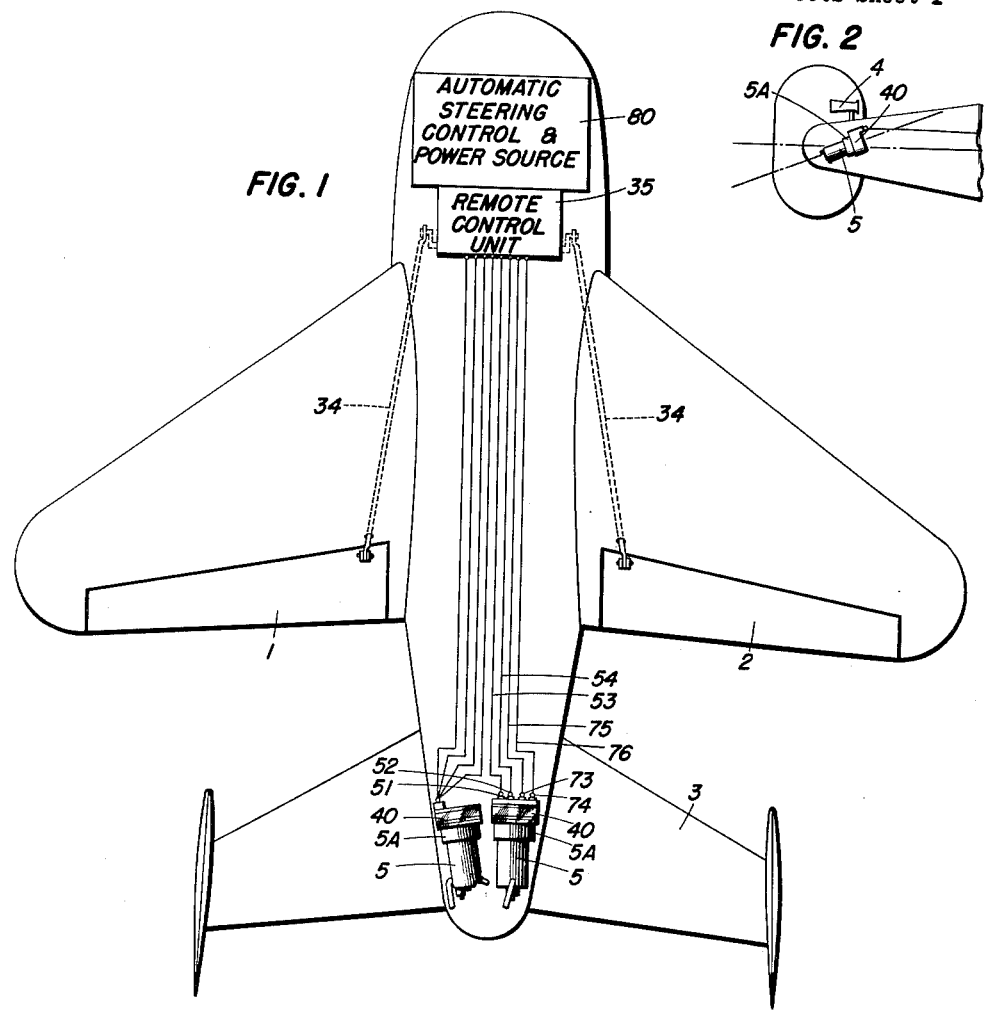

J. RABINOW ET AL 3,066,895

GYRO CONTROL SYSTEM

Filed March 31, 1945

INVENTORS
JACOB RABINOW
HAROLD K. SKRAMSTAD
BY
ATTORNEY

Dec. 4, 1962    J. RABINOW ET AL    3,066,895
GYRO CONTROL SYSTEM
Filed March 31, 1945    3 Sheets-Sheet 3

INVENTORS
JACOB RABINOW
HAROLD K. SKRAMSTAD
BY
ATTORNEY

3,066,895
GYRO CONTROL SYSTEM

Jacob Rabinow and Harold K. Skramstad, Washington, D.C., assignors to the United States of America as represented by the Secretary of the Navy
Filed Mar. 31, 1945, Ser. No. 586,011
2 Claims. (Cl. 244—79)
(Granted under Title 35, U.S. Code (1952), sec. 266)

This invention relates to robot aircraft, and more particularly to flight stabilizers therefor. Devices of this class are sometimes known as "automatic pilots."

An object of the invention is to provide such a stabilizer tending to maintain essentially straight-line flight of the craft at all times, but so arranged as to be subservient to a supervisory steering system (whose details form no part of the present invention) by means of which the flight path of the airplane may be altered.

Another object of the invention is to provide such a stabilizer which is of especial utility in controlling the flight of unmanned gliders. Such gliders may have control surfaces operated in response to radio impulses the transmission of which is regulated by a remotely located pilot, or they may be made to home on a beam of energy, such as high frequency radio waves, transmitted from or reflected by a target, in the manner disclosed in the copending application of David T. Griggs and Britton Chance, Serial No. 574,438, filed January 18, 1945. In all such remote control systems it is essential (1) that the glider be launched in the general direction of the target, (2) that it be in stable flight initially or be brought to such condition immediately if displaced therefrom at the time of launching, and (3) that it be restored to stable flight immediately after the cessation of steering effort applied by the steering system.

Our improved gyro control utilizes the moment produced by precession of either of two gyroscopes to regulate the movement of the control surfaces in a manner to achieve the indicated stabilizing effects.

It is also an object to provide such a system in which one gyroscope is mounted with its spin axis approximately horizontal and normal to the horizontal flight path, to respond to yawing movements of the glider, while another gyroscope is mounted with its spin axis approximately vertical and normal to the horizontal flight path to respond to pitching movements of the glider, but in which the gimbal axes of both gyro wheels are inclined with respect to the centerline of the glider to make the gyros responsive to glider roll as well as pitch and yaw.

Other objects and advantages will become apparent upon consideration of this disclosure in its entirety.

Referring now to the drawing:

FIG. 1 is a plan view of a glider equipped with stabilizing means constructed in accordance with our invention;

FIG. 2 is a fragmentary diagrammatic side elevational view; corresponding to a vertical longitudinal section through a rear portion of the fuselage;

FIG. 3 is a schematic wiring diagram, partly in block form;

Figure 4:
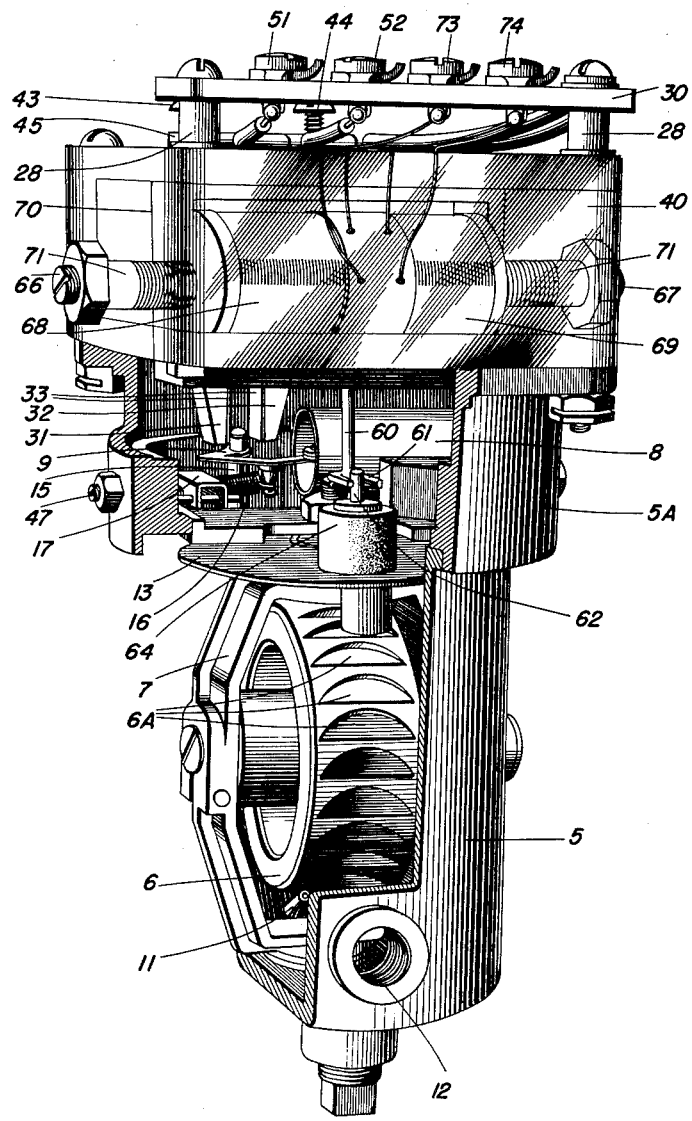
FIG. 4 is a perspective view, partly broken away, of one of the gyro units, showing the control head in place.
Figure 6:
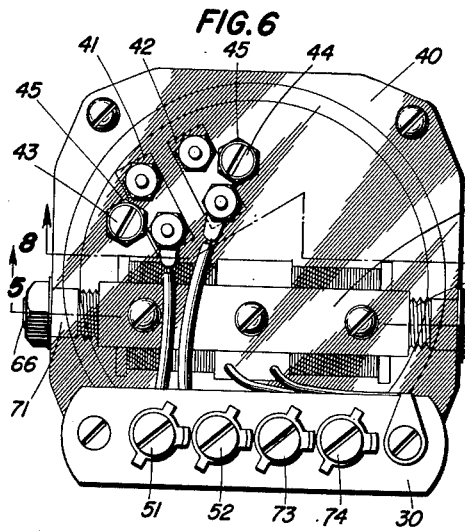
FIG. 6 is a top-plan view thereof.
Figure 7:
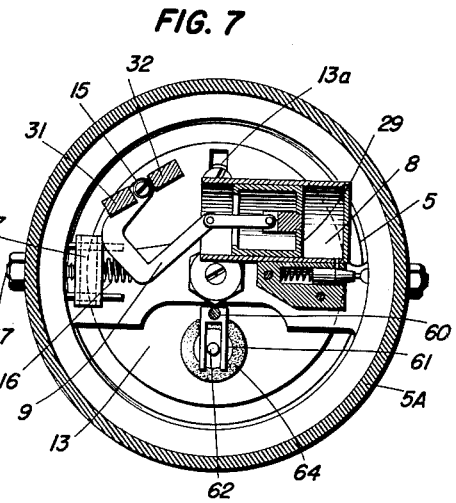
FIG. 7 is a cross section taken substantially on the line 7—7 of FIG. 5, and looking in the direction of the arrows.
Figure 5:
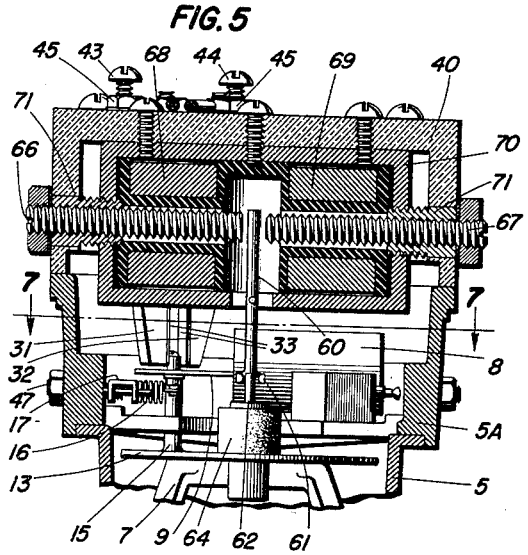
FIG. 5 is a vertical diametric section of the upper portion of one of the gyro control units.
Figure 8:
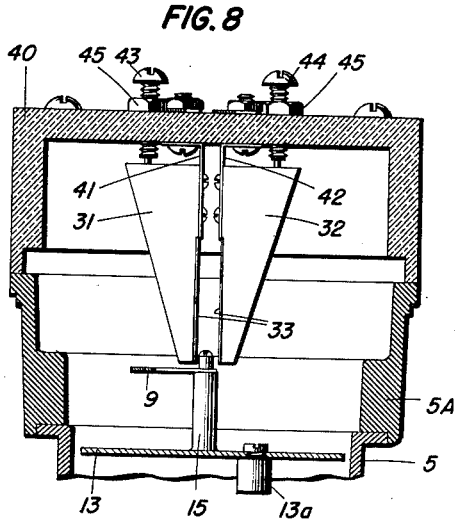
FIG. 8 is a vertical section taken substantially on the line 8—8 of FIG. 6, and looking in the direction of the arrows.
Figure 9:
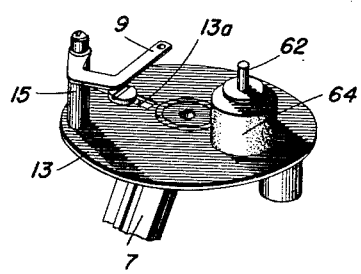
FIGS. 9 and 10 are detail perspective views of mechanical components.
Figure 10:
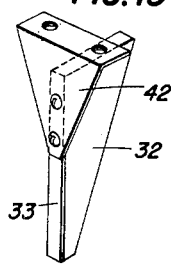

The aircraft shown in FIG. 1 is of the glider type, having its entire directional control in pitch, yaw and roll exerted through two control surfaces or elevons 1 and 2 inserted in the trailing edge of the main wing. The horizontal tail surface 3 is located at such distance from the main wing as to be in the down-wash therefrom. Downward movement of both elevons 1, 2 increases the lift while upward movement of both elevons decreases the lift under the condition of constant pitch angle for the airplane. Correction for lateral stability is of course achieved by upward movement of one elevon and downward movement of the other. For a more complete description of this airplane, the details of which form no part of the present invention, reference should be made to the copending patent application of William Hunter Ayres Boyd for "Airplane" Serial No. 484,338, filed April 24, 1943.

The flaps or elevons 1, 2 are connected to and driven by a "Remote Control Unit" 35 through the agency of rods 34. The unit 35 consists of an electric motor, clutches and suitable mechanical interlinkage whereby the rods 34 may be moved forward and/or backward simultaneously in the same or in opposite directions, or either rod may be held stationary while the other rod is moved in either direction. The "Remote Control Unit" is more completely described in copending patent application of Emmett C. Bailey and Wesley Spangenberg, for "Motor-Transmission System," Serial No. 573,398, filed January 18, 1945.

The two gyro units may be identical except for the positions in which they are mounted. As shown in FIGS. 4–10 inclusive, each unit includes a housing 5 within which the gyro wheel 6 is journaled in a suitable gimbal 7, which carries at one end the balance disc 13 which is used as a support for the means by which the gyro is controlled as well as by which its controlling function is exercised. The gyro wheel 6 is vacuum driven by a jet entering the housing 5 at 11 and directed against the buckets 6A on the periphery of the gyro wheel. The vacuum line from the housing 5 is connected thereto at 12 and leads to a low pressure source such as the venturi tube 4 mounted on the outer surface of the fuselage and pointing in the line of flight of the aircraft.

When the gyro wheel is rotating at normal speed any attempt to change the position of its spin axis will be opposed by the inertia forces of the rotating gyro.

The axes of the gimbals of both units extend fore and aft, lying in planes parallel to the longitudinal vertical centerplane of the craft, although each gimbal axis is inclined with respect to the centerline, to achieve roll response, as indicated in FIGS. 1 and 2. Any movement of the craft having an angular component with respect to an axis perpendicular to the plane of the gimbal of either unit will cause precession of that unit in a direction depending upon the direction of such angular movement of the aircraft.

Secured to one end of the gimbal frame of each unit, concentric with and perpendicular to the gimbal axis, is a balance disk 13 which rotates with the gimbal frame in precession. One of the balance weights, as 13a, mounted upon the disk, is radially adjustable to enable accurate balancing of the assembly. A pin 15, rigidly attached to and projecting from the disk 13, travels between the circumferentially spaced combined contact and abutment members 31 and 32 during precession of the gyro assembly, the extent of precessional rotation being limited, and a grounding electrical contact completed, upon engagement of the pin with one or the other of such members. The contact members 31 and 32 are carried by the hollow head casing or cover, 40, of inverted cupped form, which may be made of plastic or other suitable insulating material and is secured over and adapted to form a continuation of the enlarged portion 5A of housing 5. The balance disk 13 forms a floor for the enlarged casing section 5A, being located at the juncture of such section with the main casing section, 5, of lesser diameter, which houses the gyro.

The contact members 31—32 are of elongated triangular form the inner face of each having a resilient spring contact portion 33 which the contact pin 15 engages. Each of the contact members is carried by a flexible spring metal support 41—42 attached to the inner surface of the cover section 40. The complementary contact assemblies thus formed are mounted in such relative positioning that their operative lower ends are movable toward and away from one another, to vary their spacing, and accordingly adjust the extent of permitted precessional movement. Spring supports 41, 42 are biased to urge the lower ends of the contact members apart, movement in such direction being prevented by the screws 43—44, threaded in suitably tapped openings in the cover 40 and adapted to be manipulated to adjust the spacing of the contacts. Jam nuts 45 are provided to fix the contact spacing screw adjustment. Contact 31 is connected to a wiring terminal 51 carried upon a connector terminal strip 30, formed of insulating material and attached to the cover 40, as by means of the posts 28, contact 32 being similarly connected to the wiring terminal 52. A circuit from one or the other of terminals 51—52 to ground is completed whenever the grounded contact pin 15 mounted on the balance disk engages either of the abutment contact springs 33.

The terminals 51—52 are adapted to be connected, as by means of lead wires 53—54, to a remote control unit 35 constituting power driving means whereby the elevons 1 and 2 may be moved to control the flight of the glider in the manner previously described. The direction of movement imparted to the elevons in response to closure of the contact is such as to exert a corrective influence upon the flight path of the glider, as noted above.

A tensile centering spring 16 maintains the disk 13 and accordingly the gyro gimbal and the contact pin 15 in a centered position in which the contact pin engages neither of the contacts 31—32. Spring 16 is hooked at its outer end to an adjustable spring abutment element 17, carried by the casing section 5-A and radially movable, to vary the effective force of the spring, by means of an adjusting screw 47. At its inner end the spring is hooked to an arm 9, rigidly attached to the pin 15 and articulated to a damping piston 29 slidable in a cylinder 8 secured to the casing section 5-A.

It will be evident that the effect of the gyro unit is to tend to maintain the glider upon a substantially straight course, since any departure from such course, resulting in precession of the gyro, closes the circuit to the remote control unit in such manner as to effectuate corrective steering.

When, in response to a signal from the automatic steering control apparatus generally designated 80, the course of the glider is to be changed, simple electromagnetic means acts upon the balance plate 13, rotating the plate, and with it the gyro and gimbal, sufficiently to bring the contact 15 into engagement with one or the other of the contacts 31—32, depending upon the direction of steering. It will be seen that the turning angle will be dependent upon the length of time such contact engagement is maintained. Movement of the disk to effect such controlled steering is transmitted thereto through a vertical lever 60 carrying at its lower end a yoke 61 engageable with a pin 62 upstanding from the disk and cushioned and insulated with respect thereto by the resilient block 64, of rubber or the like, by which pin 62 is carried. The upper end of the lever forms an armature and projects between the pole pieces 66—67 of a pair of spacedly opposed axially aligned electromagnets 68—69, mounted in a frame 70 attached to the cover section 40, as shown in FIG. 4. The pole pieces are axially movable in the windings 68, 69, being threadedly mounted in bushings 71 supported in the cover and frame 70 and provided with slotted heads accessible from outside the casing to permit adjustment of the spacing between poles, and accordingly of the travel of the armature.

One terminal of each of the electromagnets is grounded, as indicated in FIG. 3, while the other terminal of each electromagnet is connected to one of the binding posts 73—74 from which connections as 75—76 are adapted to be run to the automatic steering control system, through the agency of which the electromagnets are adapted to be selectively energized. The steering control system forms no part of the present invention. It of course includes a suitable source of electric power, such as batteries, and its details are disclosed in the copending application of David T. Griggs and Britton Chance, above referred to.

It will be apparent that through adjustment of the positions of pole pieces 66—67 the effect of the electromagnets 68—69 upon the movement of lever 60 and hence of the contact pin 15 may be varied both in direction and magnitude. Preferably, pole pieces 66—67 are adjusted to control the position of pin 15 when the electromagnets 68—69 are energized, so long as the precessive force of the gyro does not exceed a certain value, for example, that corresponding to a rate of turn of 4 degrees per second.

It should be noted that precessional force of the gyro is not rendered ineffective when the electromagnets are energized, but the force of the electromagnets is adjusted to equal the precessional force when the rate of turn for which the gyros are adjusted (4°/sec., for example) is reached. If the glider should turn at a rate slightly greater than this rate the precessional force would overcome the force of the electromagnets, and the contact would close to move the controls to decrease the rate of turn. When the rate of turn becomes less than that to which the gyro is adjusted, the force of the electromagnets is greater than the precessional force of the gyro wheel, and the other contact is closed, moving the controls to increase the rate of turn. Thus this gyro control system maintains a rate of turn for which the gyro is adjusted as long as the controls are energized. When the electromagnets are deenergized, the gyro control returns the glider to a straight line course.

The invention herein described may be manufactured and used by or for the Government of the United States of America for governmental purposes without the payment of any royalties thereon or therefor.

We claim:

1. A restrained gyro device for controlling the path of an object equipped with steering means, comprising a gimbal rotatably mounted in a housing and carrying a contact member, a gyro wheel journalled in said gimbal, a pair of closely spaced electrical contacts mounted on said housing and adapted to control said steering means, said contact member being positioned between said pair of electrical contacts and movable by said gimbal to engage one or the other of said contacts when said gyro device precesses upon departure of said object from a predetermined course, electromagnetic means for developing a force on said gimbal and said contact member independently of precession force to move said contact member into engagement with one or the other of said electrical contacts in order automatically to steer said object.

2. A restrained gyro device for controlling the path of an object equipped with steering means, comprising a gimbal rotatably mounted in a housing and carrying a contact member, a gyro wheel journalled in said gimbal, a pair of closely spaced electrical contacts mounted on said housing and adapted to control said steering means, said contact member being positioned between said pair of electrical contacts and movable by said gimbal to engage one or the other of said contacts when said gyro device precesses upon departure of said object from a predetermined course, electromagnetic means for developing a force on said gimbal and said contact member to move said contact member into engagement with one or the other of said electrical contacts in order automatically to steer said object, said force developed by said electromagnetic means being adjustable to a value sufficient to overcome the resulting precession force developed by said gyro device and to maintain said contact member in engagement with one or the other of said electrical contacts only so long as the rate of turn of said object under automatic control does not exceed a predetermined value.

References Cited in the file of this patent

UNITED STATES PATENTS

| | | |
|---|---|---|
| 1,826,013 | Meredith | Oct. 6, 1931 |
| 1,869,840 | Boykow | Aug. 2, 1938 |
| 2,137,942 | Koster | Nov. 22, 1938 |
| 2,146,620 | Brown et al. | Feb. 7, 1939 |
| 2,199,256 | Florez | Apr. 30, 1940 |